US009519470B2

(12) United States Patent
Nakawaki

(10) Patent No.: US 9,519,470 B2
(45) Date of Patent: Dec. 13, 2016

(54) INFORMATION PROCESSING SYSTEM, INFORMATION PROCESSING APPARATUS, DEVICE, SOFTWARE INSTALLATION METHOD, AND STORAGE MEDIUM FOR EXECUTING SOFTWARE INSTALLATION

(71) Applicant: CANON KABUSHIKI KAISHA, Tokyo (JP)

(72) Inventor: Jun Nakawaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 14/482,298

(22) Filed: Sep. 10, 2014

(65) Prior Publication Data

US 2015/0089490 A1 Mar. 26, 2015

(30) Foreign Application Priority Data

Sep. 20, 2013 (JP) ................................. 2013-195925

(51) Int. Cl.
*G06F 9/445* (2006.01)
(52) U.S. Cl.
CPC ...................................... *G06F 8/61* (2013.01)
(58) Field of Classification Search
CPC ........................................................ G06F 9/445
USPC ........................................................ 717/174
See application file for complete search history.

(56) References Cited

U.S. PATENT DOCUMENTS

| 7,739,682 | B1 * | 6/2010 | Badenell | ................. | G06F 21/51 717/174 |
| 8,533,704 | B2 * | 9/2013 | Wookey | .................... | G06F 8/68 717/174 |
| 2004/0187105 | A1 * | 9/2004 | Inada | .................... | G06F 9/4411 717/174 |
| 2008/0103658 | A1 * | 5/2008 | Boac | ........................ | G06F 8/65 701/36 |

(Continued)

FOREIGN PATENT DOCUMENTS

JP 2010-250436 A 11/2010

OTHER PUBLICATIONS

Carvey et al., "Tracking USB Storage: Analysis of windows artifacts generated by USB storage devices", Elsevier, 2005, 7pg.*

*Primary Examiner* — Ryan Coyer
(74) *Attorney, Agent, or Firm* — Carter, DeLuca, Farrell & Schmidt, LLP

(57) ABSTRACT

An image forming apparatus stores a saving instruction for a script and data containing its identification information in a Universal Serial Bus (USB) storage, in the case where the image forming apparatus detects that the script and the data required for software installation corresponding to itself does not exist in the USB storage when the USB storage is connected. A computer acquires a script and data corresponding to identification information of an image forming apparatus contained in a saving instruction, and saves them to the USB storage, in the case where the computer detects that the saving instruction exists in the USB storage when the USB storage is connected. The image forming apparatus then executes software installation using the script and the data contained in the USB storage, when this USB storage containing the saved script and data corresponding to the image forming apparatus is connected.

7 Claims, 17 Drawing Sheets

(56) References Cited

U.S. PATENT DOCUMENTS

| | | | |
|---|---|---|---|
| 2008/0148410 A1* | 6/2008 | Wilson | G06F 21/123 726/26 |
| 2008/0244619 A1* | 10/2008 | Jeon | G06F 9/4415 719/321 |
| 2011/0125937 A1* | 5/2011 | Ito | H04N 1/00241 710/36 |
| 2012/0307280 A1* | 12/2012 | Ishihara | H04N 1/00217 358/1.13 |

* cited by examiner

FIG. 9

```xml
<?xml version="1.0" encoding="utf-8" ?>
<IScript xmlns:xsi="http://www.XXXcom/XMLSchema">
  <deviceId>
    <id>1234567890 abc</id>
  </deviceId>
  <comment>Installtion script for MFP-90</comment>

<!-- Installation Script Commands -->
  <commands>
    <!-- Update Firmware -->
    <updateFirmwareCommand order="1">
      <relativeDirPath>Firmware</relativeDirPath>
      <firmwareName>Firmware_v1.0.1.zip</firmwareName>
    </updateFirmwareCommand>

<!-- Install applications -->
    <installApplication Command order="2">
      <relativeDirPath>App</relativeDirPath>
      <AppFileName>Application001.jar</AppFileName>
      <licenseRelativeDirPath>App</licenseRelativeDirPath>
      <licenseFileName>App001-License.lic</licenseFileName>
    </installApplication Command>

<!-- Start applications -->
    <startApplication Command order="3">
      <appId>1a2b3c4d-5e6f-6413-adee-00e0032fab94c</appId>
    </startApplication Command>

<!-- Activate embedded functions -->
    <activateEmbeddedFunction Command order="4">
      <relativeDirPath>EmbeddedFunc</relativeDirPath>
      <licenseFileName>EmbeddedFunc-License.lic</licenseFileName>
    </activateEmbeddedFunction Command>

<!-- Import device configuration files -->
    <importDeviceConigCommand order="5">
      <relativeDirPath>DevConfig</relativeDirPath>
      <configFileName>deviceConfigurationFile.zip</configFileName>
    </importDeviceConigCommand>
  </commands>
</IScript>
```

FIG. 10

```
<?xml version="1.0" encoding="utf-8"?>
<request>
    <deviceId>282322AFFE5F46B6810300C707620C2C</deviceId>
    <serialNo>AAA987654</serialNo>
    <requestDateTime>2013-05-30T20:00:11.8698339+09:00</requestDateTime>
</request>
```

FIG. 14

| id | deviceId | applicationList | functionLicenseList | configurationFile | individualList |
|---|---|---|---|---|---|
| 0 | 282322AFFE5F46B6810300C707620C2C | printCustomApp.jar<br>scanCustomApp.jar | webbrowser.lic | configuration.zip | AAA987654<br>CCC123456 |
| 1 | 0A806DA5A4D3408D9AFC02C398A9B84C | faxCustomApp.jar<br>scanCustomApp.jar | pdl.lic | configuration.zip | BBB492034 |

INFORMATION PROCESSING SYSTEM, INFORMATION PROCESSING APPARATUS, DEVICE, SOFTWARE INSTALLATION METHOD, AND STORAGE MEDIUM FOR EXECUTING SOFTWARE INSTALLATION

BACKGROUND OF THE INVENTION

Field of the Invention

The present invention relates to a technology which increases the efficiency of software installation with respect to an device.

Description of the Related Art

When newly introducing an image forming apparatus, it is necessary to perform initial installation work in advance that correspond to the usage environment of the image forming apparatus. The initial installation work may include attachment of hardware options such as finishers that conduct finishing processing of printed material, and operations such as setting operations for a control program of the image forming apparatus, validation operations for licenses of extend function, and installation of extended programs. With respect to extended programs, systems have been proposed which conduct add-in to the image forming apparatus, and which allow vendors to expand functions of the image forming apparatus. As an example of this type of system, there is MEAP (registered trademark).

Installation and setting operations for a control program of an image forming apparatus are hereinafter referred to as software installation. That is, software installation is the installation of software and setting values corresponding to the software with respect to a subject device. Software installation includes installation of setting information and extended programs with respect to the device. Japanese Patent Laid-Open No. 2010-250436 discloses a print system whereby, in the case where functions of a printing device are insufficient to execute a print job that is transferred from a print server to the printing device, a notification to that effect is sent from the print server to the printing device.

Methods have been proposed for automatically conducting initial installation work according to installation instruction information by saving installation instruction information including an initial installation operation execution procedure, a control program, and an extended program to a portable external storage medium, and introducing it into the device that is to undergo initial installation work. According to this method (software installation method), it is possible to designate setting value information required for an installation instruction procedure or an installation instructions, as well as extended program and license information by an information processing apparatus that prepares and manages installation instruction information. In addition, the information processing apparatus can save the installation instruction information corresponding to the initial installation work to an external storage medium. A software installation execution instruction can then be performed to a device via the external storage device.

However, with the print system disclosed by Japanese Patent Laid-Open No. 2010-250436, the print server can only notify the device through a network that processing cannot be executed due to an insufficiency in the functions of the image forming apparatus. Therefore, with this print system, it is not possible to perform a processing execution instruction to a device via an external storage device.

It is also assumed that an operator conducts continuous execution of software installation for devices of multiple models and projects. Furthermore, it is considered that it is not possible to connect to a network at the initial installation work site.

It is assumed that it is forgotten to save the data (script and binary data) required in software installation for setup of that device to the external storage device when undertaking software installation with respect to a specific device in such an environment. In this case, the device cannot execute software installation even when the external storage device is inserted into the device. Therefore, after confirming the identification information (ID) of the subject device, the operator must return to the site where the information processing apparatus is disposed. Using a UI of the information processing apparatus, the operator must then carry out the troublesome operations of searching for the data to be used in the software installation of the subject device, and saving it to an external storage medium. As a result, it is impossible to efficiently execute software installation with respect to the device.

SUMMARY OF THE INVENTION

The present invention provides a system which efficiently executes software installation with respect to a device.

According to an aspect of the present invention, an information processing system is provided that includes a device; and an information processing apparatus which enable connection of an external storage device, wherein the device comprises: a storing unit configured to store a saving instruction for data and for a script containing identification information of the device in the external storage device, in the case where the device detects that the data and the script required for software installation corresponding to the device do not exist in the external storage device when the external storage device is connected; and an installing unit configured to execute the software installation using the script and the data contained in the external storage device when the external storage device containing the script and the data corresponding to the device is connected; and wherein the information processing apparatus comprises: a determining unit configured to determine whether or not the saving instruction for the script and the data required for the software installation exists in the external storage device when the external storage device is connected; and a saving unit configured to acquire a script and data corresponding to the identification information of the device contained in a saving instruction for the script and the data required for software installation, and to save the script and the data to the external storage device, in the case where it is determined that the saving instruction exists in the external storage device.

According to the system of the present invention, it is possible to efficiently execute software installation with respect to a device.

Further features of the present invention will become apparent from the following description of exemplary embodiments (with reference to the attached drawings).

BRIEF DESCRIPTION OF THE DRAWINGS

FIG. 9 is a diagram illustrating a script.

FIG. 10 is an example of saving instruction information of installation instruction information.

FIG. 14 is an example of an installation instruction information DB.

DESCRIPTION OF THE EMBODIMENTS (First Embodiment)

Figure 1:
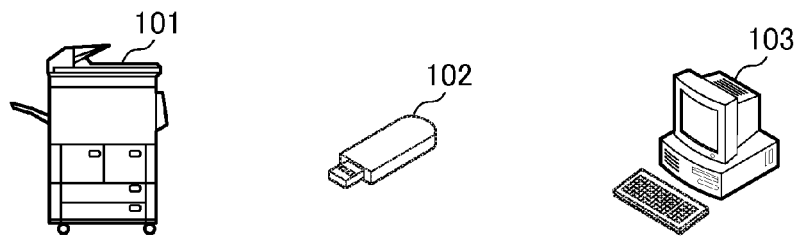
FIG. 1 is a diagram illustrating an exemplary system configuration of the present embodiment.

FIG. 1 is a diagram illustrating a system configuration example of the present embodiment. An information processing system shown in FIG. 1 executes initial installation work including software installation.

An information processing system is provided with an image forming apparatus 101, a USB storage 102, and a client computer 103. The image forming apparatus 101 is an all-in-one machine which has multiple functions such as scanner, printer, facsimile, and file transmission functions. In addition, the image forming apparatus 101 has an interface that connects the USB storage 102 that is an external storage device. There are no limitations on the type of interface that connects the USB storage 102, but a USB (universal serial bus) interface is used in the present embodiment. By connecting the USB storage 102 to the USB interface, the image forming apparatus 101 can conduct data reading and writing with respect to the USB storage 102.

There are no limitations on the type of USB storage 102, provided that it is an external storage device that can be easily removed from host equipment. In the present embodiment, a USB storage which implements a USB mass storage class is used as the USB storage 102.

The client computer 103 is a personal computer, and has an interface for connecting the USB storage 102. There are no limitations on the type of interface that connects the USB storage 102, and a USB interface is used in the present embodiment. By connecting the USB storage 102 to the USB interface, the client computer 103 is able to conduct reading and writing with respect to the USB storage 102.

Figure 2:
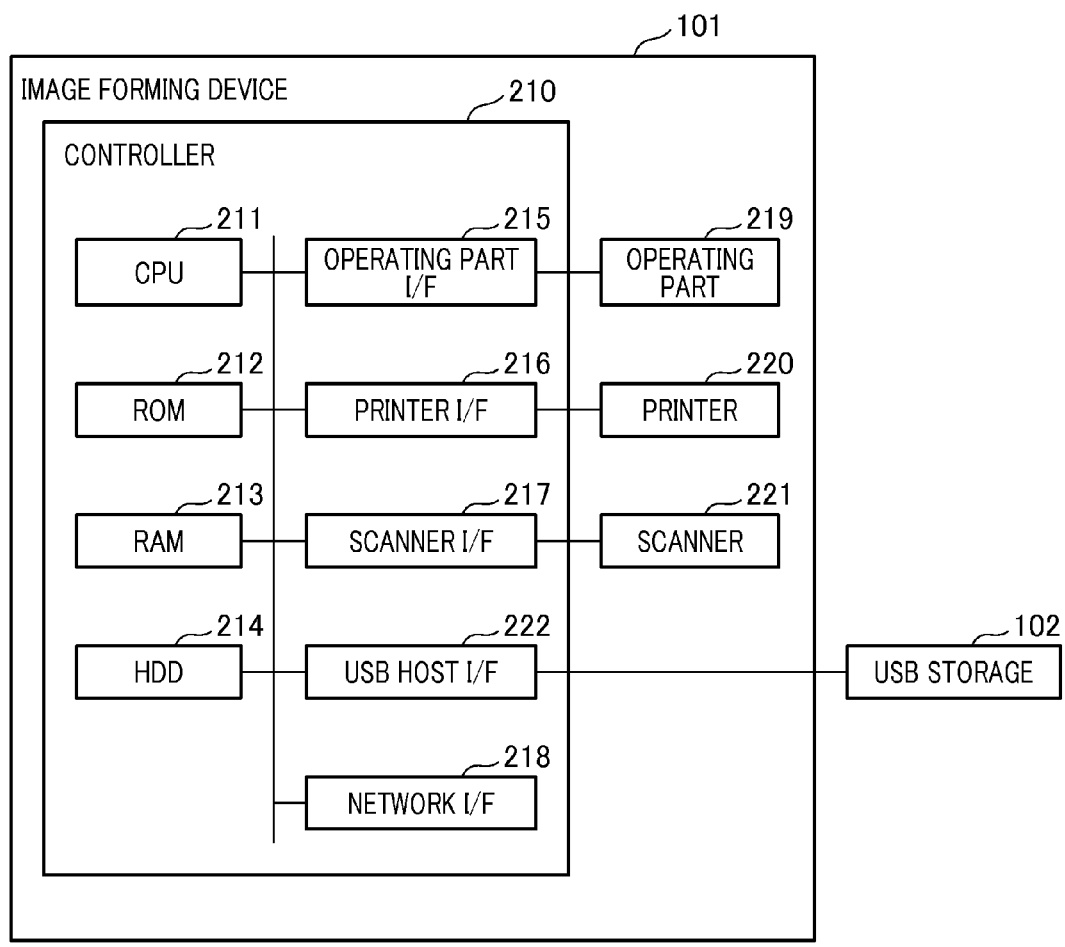
FIG. 2 is a diagram illustrating an exemplary configuration of an image forming apparatus.

FIG. 2 is a diagram illustrating an exemplary configuration of an image forming apparatus. The image forming apparatus 101 is provided with a control unit 210, an operating part 219, a printer 220, and a scanner 221. The USB storage 102 is an external storage device for storage of data, and can be removably attached to the image forming apparatus 101. The USB storage 102 connects to the control unit 210 via a USB host I/F (interface) 222.

The control unit 210 controls all operations of the image forming apparatus 101. The control unit 210 is provided with a CPU 211 and a network I/F (interface) 218. CPU is an abbreviation for "central processing unit."

The CPU 211 reads out a control program stored in a ROM (Read Only Memory) 212, and conducts various types of control such as reading control and transmission control. A RAM (Random Access Memory) 213 is the main memory of the CPU 211, and is used as a temporary storage area such as a work area.

An HDD 214 stores image data as well as various types of programs or various types of information tables. An operating part I/F 215 connects the control unit 210 and the operating part 219. The operating part 219 is provided with a liquid crystal display part having a touch panel function, and a keyboard or the like.

A printer I/F 216 connects the control unit 210 and the printer 220. Image data to be printed by the printer 220 is transferred from the control unit 210 via the printer I/F 216, and is printed onto a recording medium in the printer 220.

A scanner I/F 217 connects the control unit 210 and the scanner 221. The scanner 221 reads an image on a manuscript to generate image data, and inputs it to the control unit 210 via the scanner I/F 217.

A network I/F 218 connects the control unit 210 (image forming apparatus 101) to a network (e.g., a LAN). The network I/F 218 transmits image data and information to an external device on a LAN, and receives various types of information from an external device on a LAN.

The USB host I/F 222 is an interface that communicates with the USB storage 102. The USB host I/F 222 outputs data stored in the HDD 214 to the USB storage 102. The USB host I/F 222 also inputs data stored in the USB storage 102 and transfers the data to the CPU 211. The USB storage 102 is an external storage device that stores data, and can be removably attached to the USB host I/F 222. A plurality of USB devices including the USB storage 102 can be connected to the USB host I/F 222.

Figure 3:
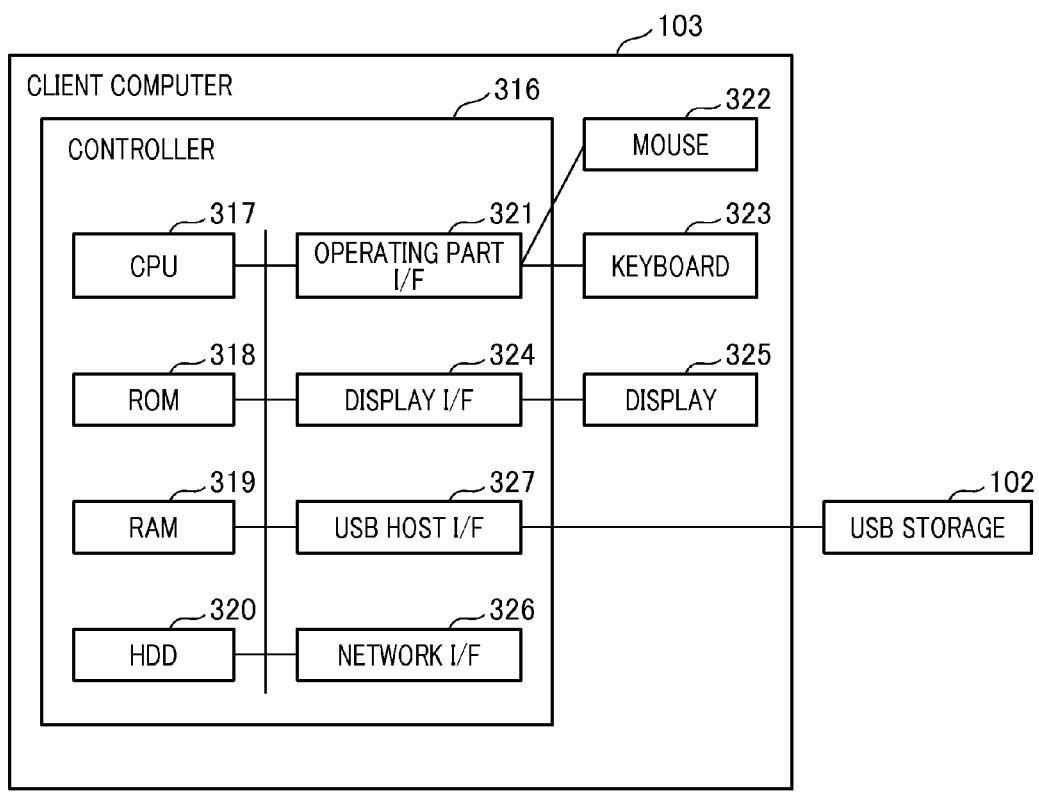
FIG. 3 is a diagram illustrating an exemplary configuration of a client computer.

FIG. 3 is a diagram illustrating an exemplary configuration of the client computer 103. The client computer 103 is provided with a control unit 316, a mouse 322, a keyboard 323, and a display 325.

The computer control unit 316 controls all operations of the client computer 103. The control unit 316 is provided with a CPU 317 and a network I/F 326. The CPU 317 reads out a control program stored in a ROM 318 to execute various types of control processing. A RAM 319 is the main memory of the CPU 311, and is used as a temporary storage area such as a work area. An HDD 320 stores image data as well as various types of programs, or various types of information tables that are described below.

An operating part I/F 321 is an I/F which connects a user interface terminal that inputs control operations to a program executed by the client computer 103. In the present invention, the user interface terminals are the mouse 322 and the keyboard 323, but an input terminal other than the mouse 322 or the keyboard 323 can also be used as a user interface terminal.

The display I/F 324 is an I/F which connects a display terminal that displays a UI of a program run by the client computer 103. In this example, the display terminal is the display 325, but a device other than the display 325 can also be used as the display terminal.

The network I/F 326 connects the control unit 316 to a network (LAN). The network I/F 326 transmits and receives various types of information with other devices via a LAN. A USB host I/F 327 is an interface that communicates with the USB storage 102. The USB host I/F 327 outputs data stored in the HDD 320 to the USB storage 102. The USB host I/F 327 also inputs data stored in the USB storage 102, transferring it to the CPU 317. The USB storage 102 is an external storage device that stores data, and can be removably attached to the USB host I/F 327. A plurality of USB devices including the USB storage 102 can be connected to the USB host I/F 327.

Figure 4:
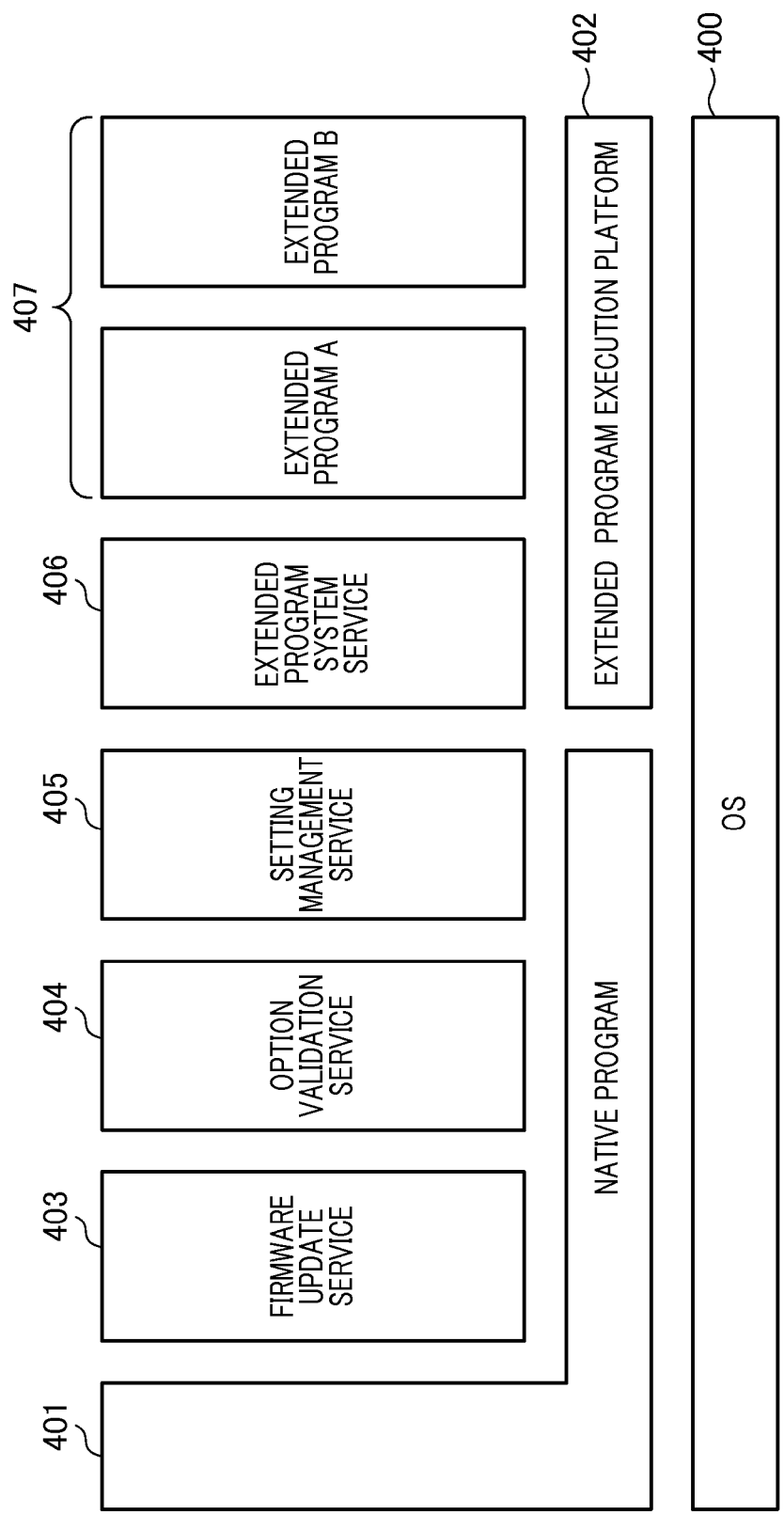
FIG. 4 is a diagram illustrating an exemplary software configuration of an image forming apparatus.

FIG. 4 is a diagram illustrating an exemplary software configuration of an image forming apparatus for purposes of executing software installation. On an OS 400, there operates a native program 401 which is an originally provided control program of a printer, fax, scanner, or the like, and an extended program execution platform 402 which is an extended program execution platform. Furthermore, a firmware update service 403, an option validation service 404, and a setting management service 405 operate with the native program 401. In addition, an extended program system service 406 and an extended program 407 operate on the extended program execution platform 402.

The firmware update service 403 is a service which provides various types of functions for updating firmware. For example, the firmware update service 403 references firmware designated by a user, and determines whether or not updating of the designated firmware is required. The firmware update service 403 also updates firmware with respect to the native program 401, or via the native program 401.

The option validation service 404 is a service for validating option functions that are embedded in advance in the native program 401. The option validation service 404 identifies, and validates specified option functions according to an option license file designated by a user.

The setting management service 405 is a service for managing various types of setting information such as that for a printer, a scanner, or the like. For example, when a user designates a file containing a single setting or a plurality of settings, or a plurality of pieces of setting information, the setting management service 405 rewrites the setting information of the native program 401. Otherwise, the setting management service 405 has a user interface (hereinafter "UI"), and a user can perform setting change instructions via the operating part 219 of the image forming apparatus 101.

The extended program system service 406 is a useful utility library shared by extended programs. The extended program system service 406 is provided by the system. By calling up a function of the extended program system service 406 from the extended program 407, it is possible to eliminate the trouble of developing an extended program.

The extended program 407 can access another extended program 407 or the respective modules of the image forming apparatus 101 such as the RAM 213 only via the extended program execution platform 402 or the extended program system service 406. The extended program 407 which has a UI can also display an icon on a main menu screen (FIG. 5) that is displayed in the operating part 219 of the image forming apparatus 101. When the operating part I/F 215 detects through the operating part 219 that a user has selected this icon, the operating part I/F 215 notifies the CPU 211 thereof. Upon receipt of this notification, the CPU 211 displays the UI of the extended program selected by the user in the operating part 219.

Otherwise, the configuration shown in FIG. 4 only describes basic parts, and other services and the like may be included according to the implementation environment. Services that are unnecessary due to restrictions on settings or the like may be omitted from the image forming apparatus 101.

Figure 5:
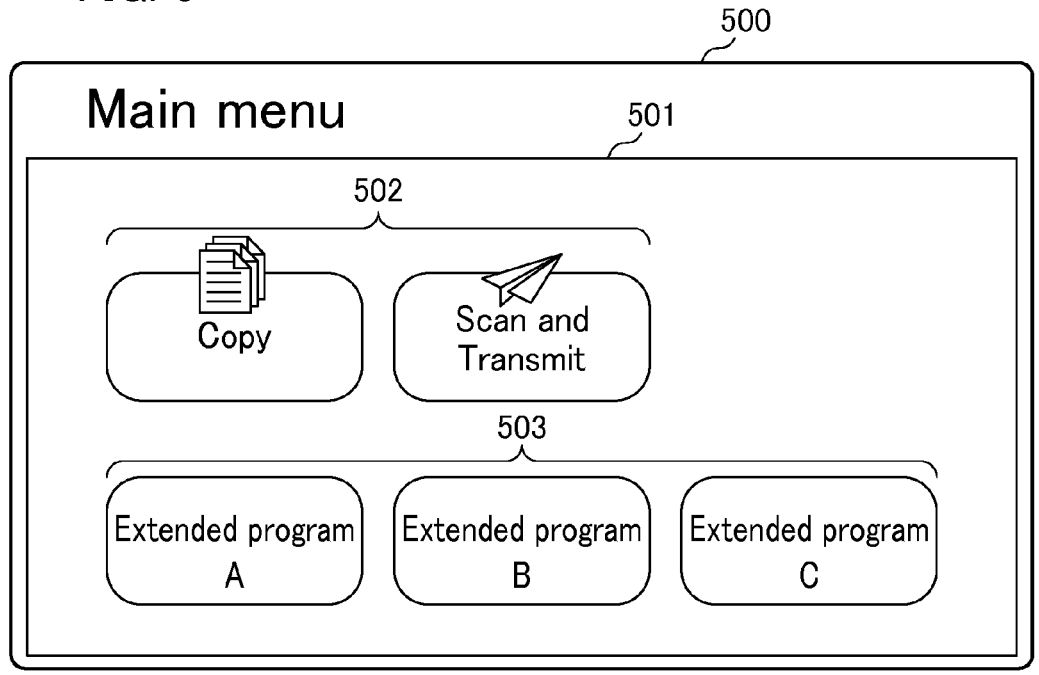
FIG. 5 is a diagram illustrating an exemplary main menu screen.

FIG. 5 is a diagram illustrating an example of a main menu screen displayed in an operating part of an image forming apparatus. A main menu screen 500 has a program icon display area 501, a standard program icon 502, and an extended program icon 503.

The program icon display area 501 is an area which displays an icon of a program that can be currently operated by the image forming apparatus 101. The standard program icon 502 is an icon for displaying a UI that serves to operate functions possessed by the control program of the image forming apparatus 101. The extended program icon 503 is an icon for displaying a UI that serves to operate an extended program of the image forming apparatus 101.

Initial installation work of the image forming apparatus 101 is described as follows. When conducting initial installation work for an image forming apparatus 101, the operator installs an extended program in the image forming apparatus 101 that is subject to the installation work. The USB storage 102 is then connected thereto.

The extended program writes saving instruction information for installation instruction information into the USB storage 102 (the saving instruction information output processing for installation instruction information described below). A saving instruction for installation instruction information is information which instructs (requests) that installation instruction information be saved in the USB storage 102. Installation instruction information includes a script that is an instruction sheet indicating an operational procedure for automatic execution of initial installation work. In this example, the installation instruction information includes a script indicating an operational procedure for software installation.

Next, the operator removes the USB storage 102 from the image forming apparatus 101, and connects it to the client computer 103. A management system 700 (FIG. 7) which operates in the client computer 103 detects the saving instruction information stored in the USB storage 102. The management system 700 writes the installation instruction information of the pertinent image forming apparatus into the USB storage 102 (the installation instruction information output processing described below).

The operator removes the USB storage 102 from the client computer 103, and again connects it to the image forming apparatus 101. The extended program of the image forming apparatus 101 then detects the installation instruction information that is written in the USB storage 102, and automatically executes the installation work recorded in the script contained in the installation instruction information.

The saving instruction information output processing for installation instruction information described below is carried out by an initial installation work support program that is an extended program. The initial installation work support program is preferably installed at the stage where the image forming apparatus is shipped from the production site, but it may also be installed at the initial installation work site. The installation instruction information output processing described below is executed by a program that is run by the client computer.

Figure 6:
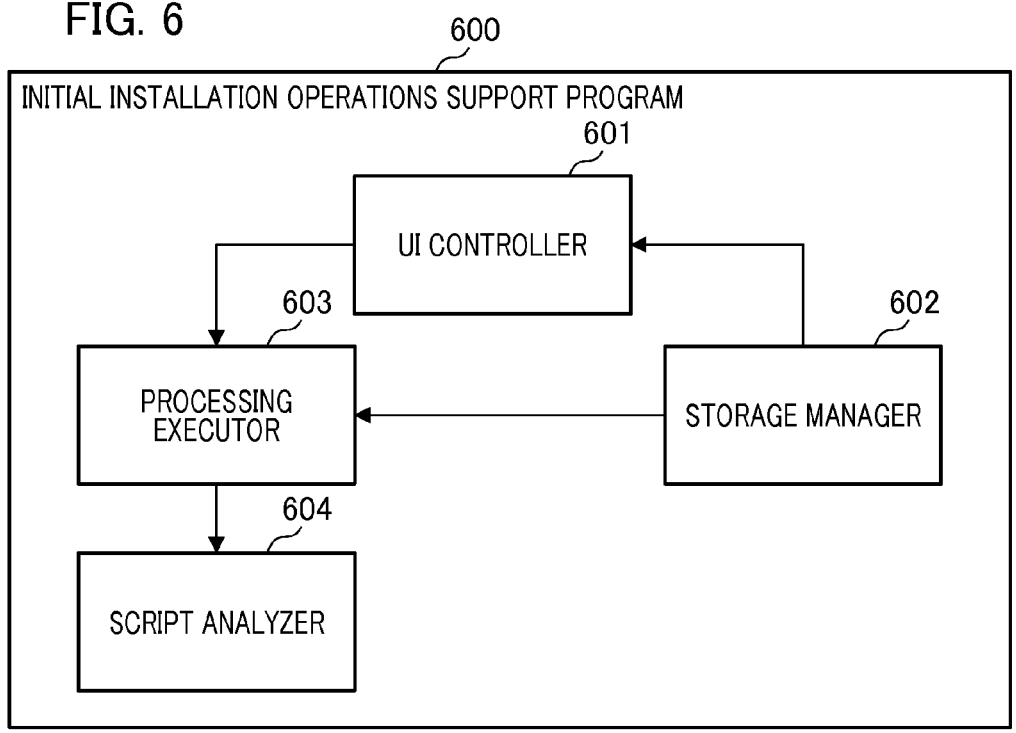
FIG. 6 is a diagram illustrating an exemplary configuration of a functional configuration of an initial installation work support program.

FIG. 6 is a diagram illustrating an exemplary configuration of a functional configuration of an initial installation work support program. An initial installation work support program 600 is run by the image forming apparatus 101. The CPU 211 performs the various processing steps of the flowchart shown in FIG. 8 by executing the initial installation work support program 600.

The initial installation work support program 600 is provided with a UI control unit 601, a storage manager 602, a processing executor 603, and a script analyzer 604.

The UI control unit 601 provides the operator through the operating part 219 with a UI for operating the initial installation work support program, and accepts operations of the operator. The storage manager 602 conducts reading and writing of the data of the USB storage 102. The storage manager 602 also detects insertion and removal of the USB storage 102.

The processing executor 603 conducts various types of processing according to instructions from the UI control unit 601 and the storage manager 602. The script analyzer 604 analyzes a script contained in the installation work instruction information stored in the USB storage 102, and determines the processing to be executed by the processing executor 603, and its sequence.

Figure 7:
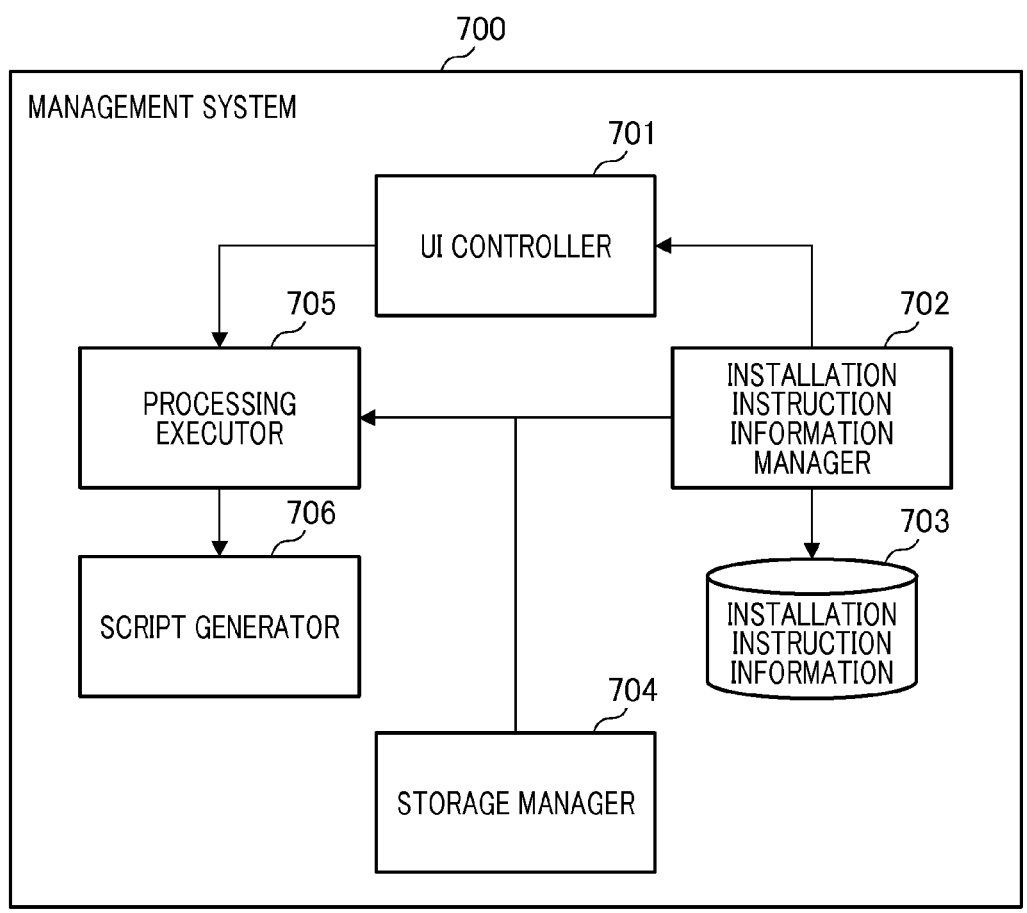
FIG. 7 is a diagram illustrating an exemplary functional configuration of a management system.

FIG. 7 is a diagram illustrating an exemplary functional configuration of a management system with which the client computer 103 is provided. A management system 700 manages installation instruction information, and executes the processing shown in FIG. 13, FIG. 17, and FIG. 18 when the USB storage 102 is inserted into the client computer 103. To implement the functions of the management system 700, the CPU 317 stores a program that is in the HDD 320 in the RAM 319, and runs it.

In the present embodiment, it is assumed that programs are executed on the client computer 103, but one is not limited to this case. Programs may also be executed by a server or service on a network via the network I/F 326.

The management system 700 is provided with a UI control unit 701, an installation instruction information manager 702, an installation instruction information 703, a storage manager 704, a processing executor 705, and a script generator 706.

The UI control unit 701 provides the operator through the display 325 with a UI for operating the management system 700, and accepts operations of the operator through the mouse 322 and the keyboard 323.

The installation instruction information manager 702 manages reading and writing of installation instruction information according to instructions of the UI control unit 701 and the processing executor 705, and retains installation instruction information in the installation instruction information database 703. The installation instruction information database 703 is assumed to be an SQL database, but is not limited to this case. The client computer 103 may also retain installation instruction information in a file format structured into a file system. Moreover, it is assumed in the present embodiment that installation instruction information is saved in the HDD 320 of the client computer 103, but one is not limited to this case, and installation instruction information may also be managed by a server or service on a network via the network I/F 326.

The storage manager 704 performs reading and writing of data of the USB storage 102. The storage manager 704 also detects insertion and removal of the USB storage 102. The processing executor 705 performs various types of processing according to instructions of the UI control unit 701 and the storage manager 704.

The script generator 706 generates a script that can be analyzed by the initial installation work support program 600 according to instructions of the processing executor 705, and outputs installation instruction information including the generated script.

Figure 20:
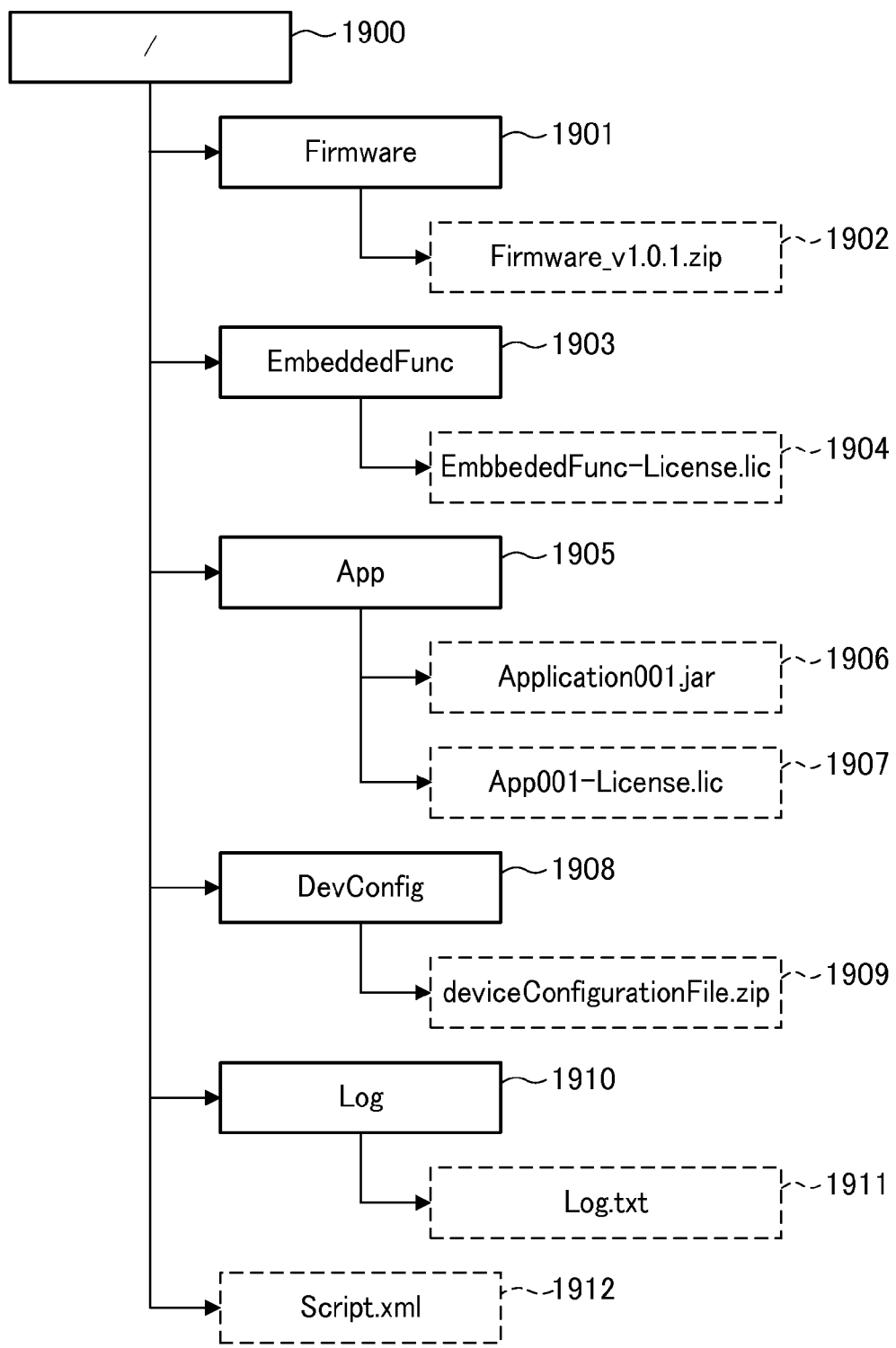
FIG. 20 is a diagram illustrating an exemplary folder and file configuration in a USB storage used by an initial installation work support program.

FIG. 20 is a diagram illustrating an exemplary folder and file configuration in a USB storage used by an initial installation work support program. In a root folder 1900, there is a Firmware folder 1901, an EmbeddedFunc folder 1903, an App folder 1905, a DevConfig folder 1908, a Log folder 1910, and a Script.xml file 1912.

The Firmware folder 1901 is a folder which stores firmware to be updated with respect to the image forming apparatus 101. In the Firmware folder 1901, there is a Firmware_v1.0.1.zip file 1902 in which a firmware group is archived in zip format.

The EmbeddedFunc folder 1903 is a folder which stores a license file for activating functions that are preinstalled in the image forming apparatus 101. In the EmbeddedFunc folder 1903, there is a license file EmbeddedFunc-License.lic 1904.

The App folder 1905 is a folder which stores extended programs to be installed in the image forming apparatus 101 during initial installation work, and license files required for installation of the extended programs. In the App folder 1905, there is an extended program Application001.jar 1906, and a license file App001-License.lic 1907.

The DevConfig folder 1908 is a folder which stores setting information that is set in advance in a reference image forming apparatus, and exported. In the DevConfig folder 1908, there is a file deviceConfigurationFile.zip 1909 that is archived in zip format.

The Log folder 1910 is a folder for storing the files (hereinafter "log") resulting from what is executed by the initial installation work support program. In the Log folder 1910, there is a Log.txt 1911.

Prior to execution of the initial installation work support program, the Log folder 1910 and the Log.txt 1911 do not exist. This folder and file are created by the initial installation work support program, which prepares and copies the prescribed folder and the like at a certain point during or after execution of the initial installation work support program.

The Script.xml 1912 is a script which indicates an operational procedure for automatically processing initial installation work. The script is described in detail below with reference to FIG. 9. This script is a file that defines the initial installation work procedure. The image forming apparatus 101 may determine the feasibility of execution of the initial installation work support program according to the existence or non-existence of the Script.xml 1912. In short, the existence of the Script.xml 1912 itself may be an identifier indicating that the USB storage 102 currently in use is the USB storage for the initial installation work support program. The configuration shown in FIG. 20 is exemplary; one is not limited thereto, and any folder configuration may be adopted.

FIG. 9 is a diagram illustrating a script used in the present embodiment. A script 900 is read by the storage manager 602 of the initial installation work support program 600, and is analyzed by the script analyzer 604 via the processing executor 603. When the script 900 is analyzed by the script analyzer 604, the processing executor 603 executes the initial installation work described in the script 900 based on the analytic results.

The script 900 shown in FIG. 9 is described in XML (Extensible Markup Language), and has an image forming apparatus identification part 901 and a processing content part 902. The script is expressed by XML in FIG. 9, but the script expression format is not limited to XML, and may be written in shell script, and the like.

In the image forming apparatus identification part 901, information is described for purposes of identifying the image forming apparatus 101 subject to initial installation work. The image forming apparatus identification part 901 has a <deviceId> which is identification information (an identifier) of the image forming apparatus 101, and a <comment> which shows the content of this script in an arbitrary character string. In addition to describing the content of this script, <comment> may also be used as an identifier when identification is impossible with <deviceId> alone. For example, it may be used as an identifier in the case where it is necessary to prepare multiple settings for a single image forming apparatus 101.

The processing group required for execution of initial installation work is described in the processing content part 902. In FIG. 9, the processing content part 902 has a firmware update processing 903, an extended program installation processing 904, and an extended program initiation processing 905. The processing content part 902 also has a system-embedded option program activation processing 906, and a setting information importation processing 907. An Order attribution is contained in the tag that shows the processing of each initial installation operation, and the order of initial installation work is determined in this example according to Order values. In the case where a processing order is not specifically designated, the Order values may be made identical.

In the case where Order values are identical, the processing executor 603 may perform execution in the order which is written in the processing content part 902, or it may perform execution in the order in which the script analyzer 604 carried out reading. The processing executor 603 may also determine the order of execution based on the data volume used in the respective processing.

The firmware update processing 903 is processing in which firmware is updated via the firmware update service 303. With respect to the firmware update processing 903, processing is defined by describing an <updateFirmwareCommand> tag, and the files for use are designated by a <relativeDirPath> tag and a <FirmwareName> tag. The <relativeDirPath> tag describes a relative path from the root folder 1900 to the firmware to be updated. The <FirmwareName> tag designates the firmware to be updated. In this example, firmware is designated that is archived in zip format.

With respect to the extended program installation processing 904, processing is defined by describing an <installApplicationCommand> tag. The extended program that is installed is designated by a <relativeDirPath> tag and an <AppFileName> tag.

The <relativeDirPath> tag describes a relative path from the root folder 1900 to the actual extended program that is the subject of installation. The <AppFileName> tag designates the actual extended program that is the subject of installation. In FIG. 9, the extended program is designated in Jar file format, but the format of the extended program is not limited to Jar file format.

A license relative to the extended program that is the subject of installation is designated by a <licenseRelativeDirPath> tag and a <licenseFileName> tag. The <licenseRelativeDirPath> tag describes a relative path from the root folder 1900 to the license file of the extended program. The <licenseFileName> tag designates the actual license of the extended program. In FIG. 9, a license file of the lic file format is designated, but the license file format is not limited thereto.

With respect to the extended program initiation processing 905, processing is defined by describing of a <startApplicationCommand> tag, and the extended program subject to initiation is designated by an <appId> tag. The <appId> tag designates an ID for uniquely identifying the extended program subject to initiation.

With respect to the system-embedded option program activation processing 906, the processing is defined by recording of a <activateEmbeddedFunctionCommand> tag. The embedded option program that is activated is then designated by a <relativeDirPath> tag and a <licenseFileName> tag.

The <relativeDirPath> tag describes a relative path from the root folder 1900 to a license file of the embedded option program that is activated. The <licenseFileName> tag designates the actual license that serves to validate the embedded option program. In FIG. 9, a license file of the lic format is designated, but the license file format is not limited thereto. In the case where there does not exist a preinstalled embedded option program in the image forming apparatus 101, or in the case where it is not validated, there is no need to describe this initial installation operation processing.

With respect to the setting information importation processing 907, the processing is defined by describing an <importDeviceConfigCommand> tag. The setting information file that is imported is designated by a <relativeDirPath> tag and a <configFileName> tag.

The <relativeDirPath> tag describes a relative path from the root folder 1900 to the setting information file that is subject to importation. The <configFileName> tag designates the setting information file that is subject to importation. In this drawing, a setting information file that is archived in zip format is designated, but the format of the setting information file is not limited to a zip file format.

Initial installation operation processing of the script is not limited to the processing described in the script 900 of FIG. 9. For example, it is also acceptable to add processing that reboots the image forming apparatus 101, and other processing to the script 900. It is also acceptable to duplicate, add, or omit processing as necessary.

Figure 8:
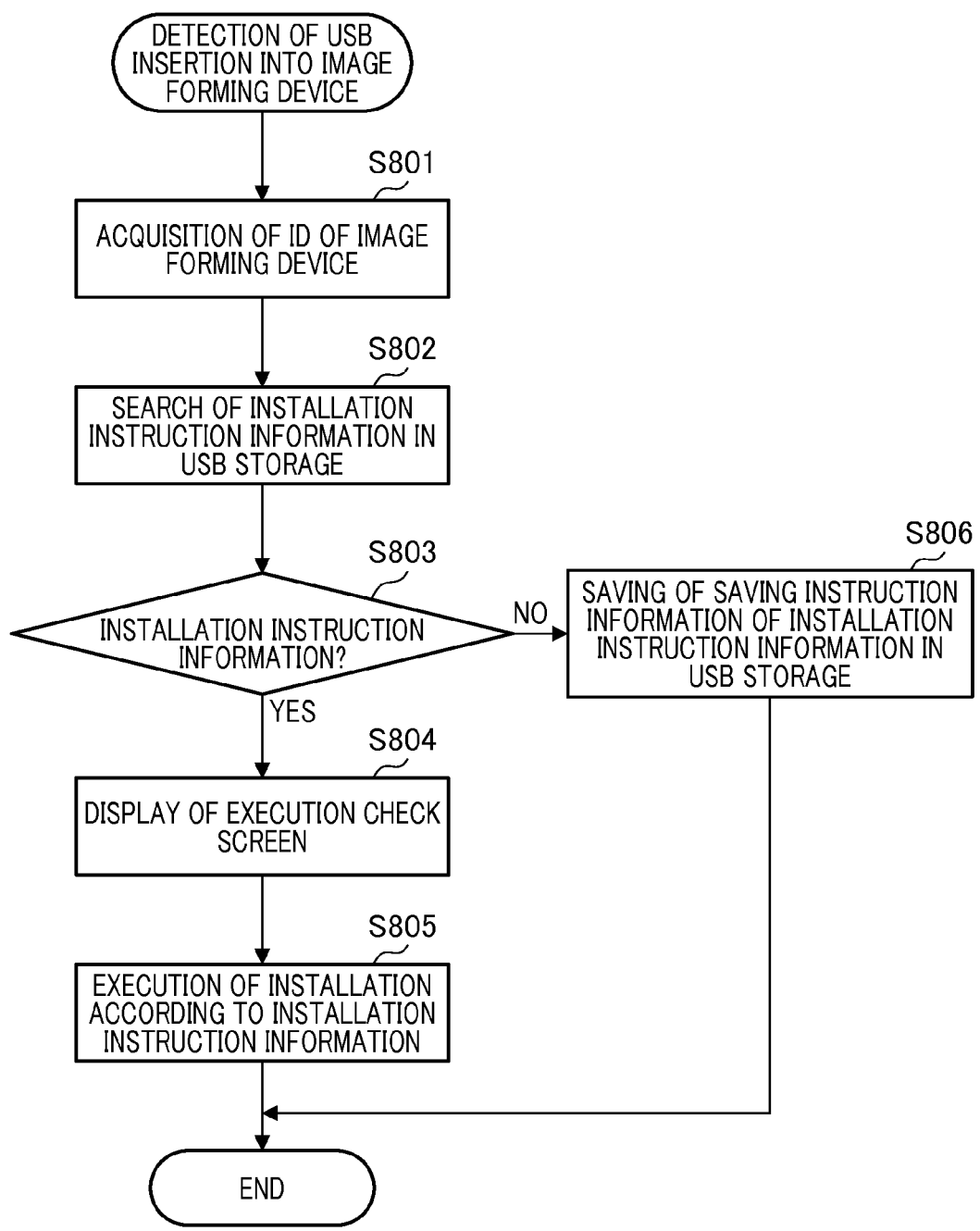
FIG. 8 is a flowchart illustrating saving instruction information output processing of installation instruction information.

FIG. 8 is a flowchart illustrating saving instruction information output processing of installation instruction information. Saving instruction information output processing of installation instruction information is performed after insertion of the USB storage 102 has been detected by the initial installation work support program 600.

The storage manager 602 detects that the USB storage has been inserted into (connected to) the image forming apparatus 101. The storage manager 602 acquires the ID of the image forming apparatus 101 (step S801). This ID is information such as an individual identifier or model number of the image forming apparatus that identifies the image forming apparatus that is to undergo installation work.

Next, the storage manager 602 searches the script file of the installation instruction information saved in the USB storage 102, and identifies the installation instruction information to be executed (step S802). The storage manager 602 performs the search according to the extensions of the script file.

The storage manager 602 also searches the installation instruction information to be executed based on the ID acquired in step S801. In the case where the ID of the image forming apparatus 101 is described in the script file, the storage manager 602 determines that the installation instruction information including this script file is the installation instruction information to be executed. In the case where the ID of the image forming apparatus 101 is not described in the script file, the storage manager 602 determines that the installation instruction information including this script file is not the installation instruction information to be executed.

The script file 900 shown in the above-described FIG. 9 describes the ID 901 of the image forming apparatus to be applied. Accordingly, the storage manager 602 determines whether the script file 900 is the installation instruction information to be executed according to whether its own ID—i.e., the ID of the image forming apparatus 101—is described in the ID 901.

Returning to FIG. 8, the storage manager 602 determines whether the installation instruction information to be executed has been found (step S803). In the case where the installation instruction information to be executed has been found, the processing advances to step S804. In the case where the installation instruction information to be executed has not been found, the processing advances to step S806.

In step S804, the UI control unit 601 displays the installation instruction information that has been found by the determination processing of step S802 and the script file containing this installation instruction information on an implementing instruction screen, and notifies the operator thereof.

Figure 11:
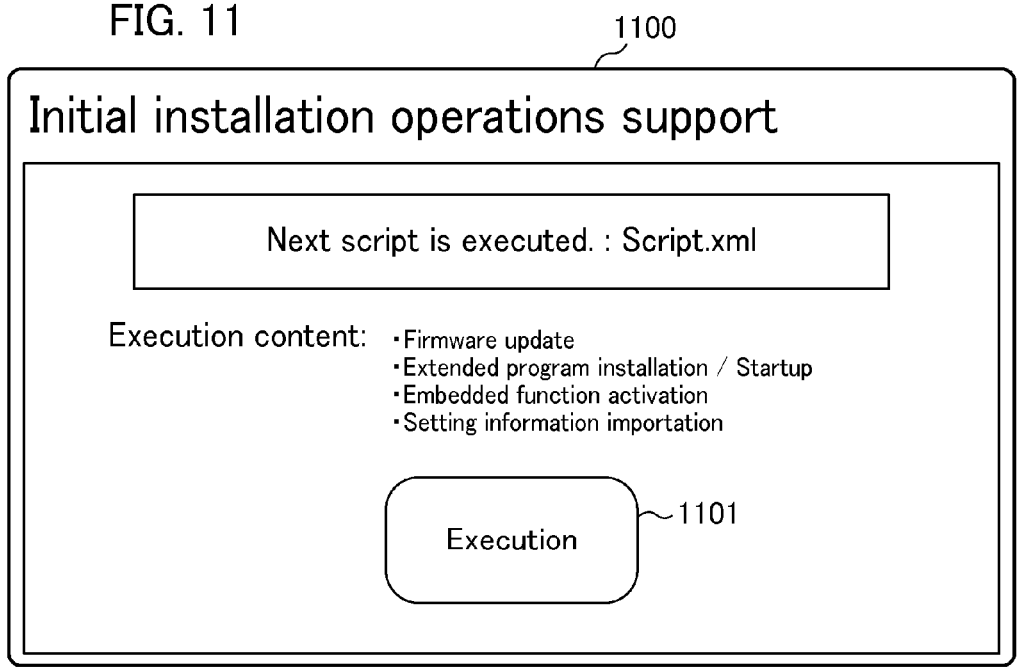
FIG. 11 is a diagram illustrating an exemplary execution instruction screen.

FIG. 11 is a diagram illustrating an example of an implementing instruction screen. An implementing instruction screen 1100 displays the contents of the installation instruction information that is executed. The operator checks the contents of the installation instruction information, and presses down an execution button 1101, whereupon the processing advances to step S805 of FIG. 8.

Figure 12:
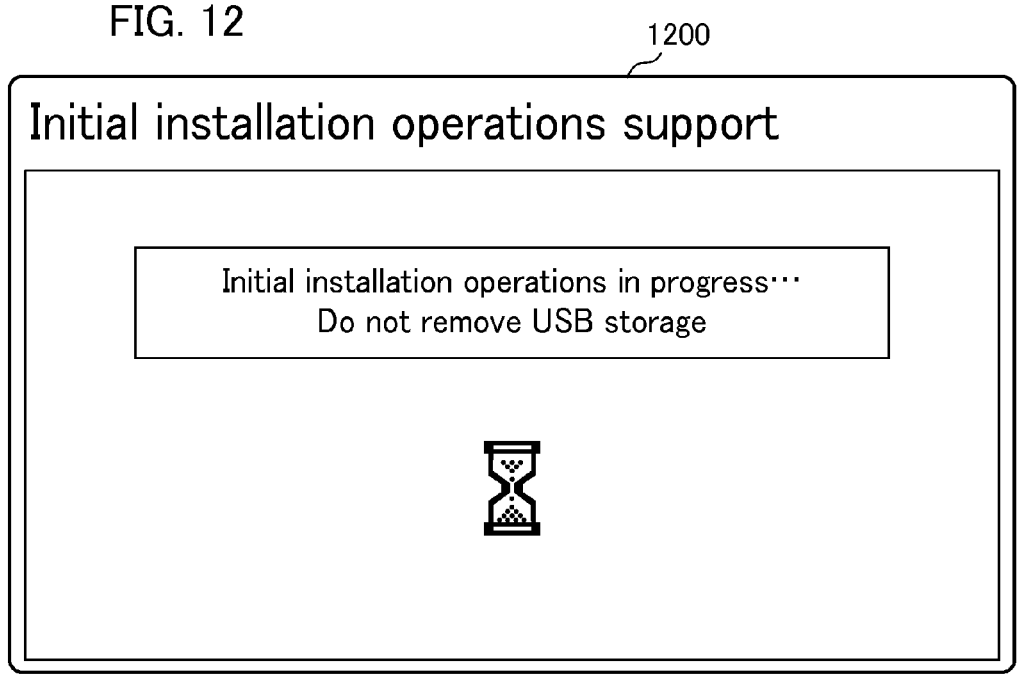
FIG. 12 is a diagram illustrating an exemplary implementation screen.

In step S805, the processing executor 603 carries out initial installation work by executing various commands according to the description of the command execution sequence 902 in the script file contained in the installation instruction information found by the determination processing of step S802. The commands enable execution of the software installation, updating, and setting operations that must be executed as initial installation work. By executing the commands, for example, updating of the firmware containing the native program 401 of the image forming apparatus 101 is conducted, and installation and startup of the extended program 406 are carried out. Furthermore, in step S805, the UI control unit 601 displays an implementation screen 1200 shown in FIG. 12. The implementation screen 1200 is a screen which provides notification that initial installation work are underway.

In step S806, the storage manager 602 writes the saving instruction information of the installation instruction information into the USB storage 102.

FIG. 10 illustrates an example of saving instruction information of installation instruction information. Saving instruction information 1000 describes an ID of an image forming apparatus for which initial installation work are to be executed, and a date, time and the like corresponding to creation of the saving instruction information.

Figure 13:
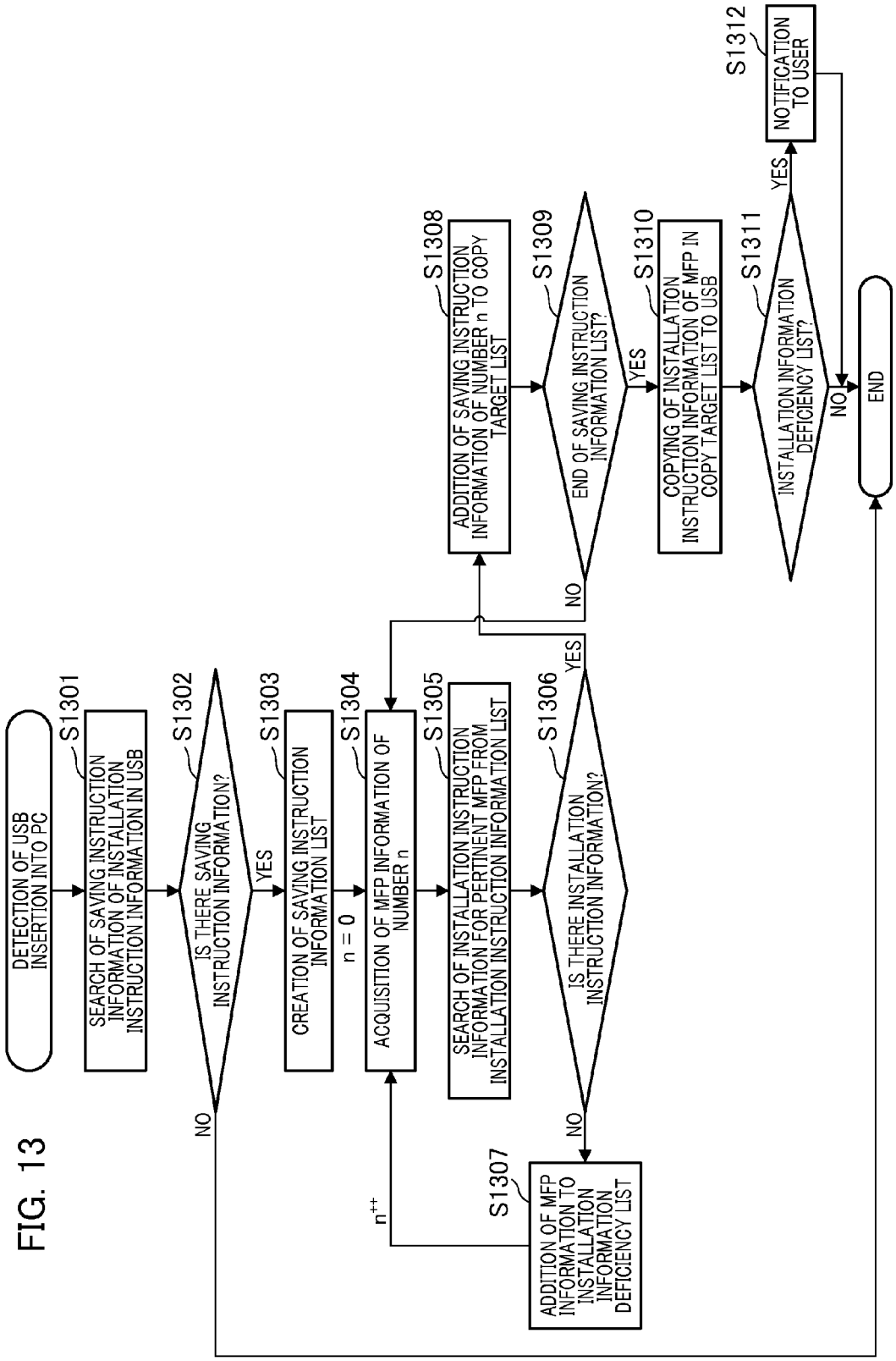
FIG. 13 is a flowchart illustrating an example of installation instruction information output processing.
Figure 15:
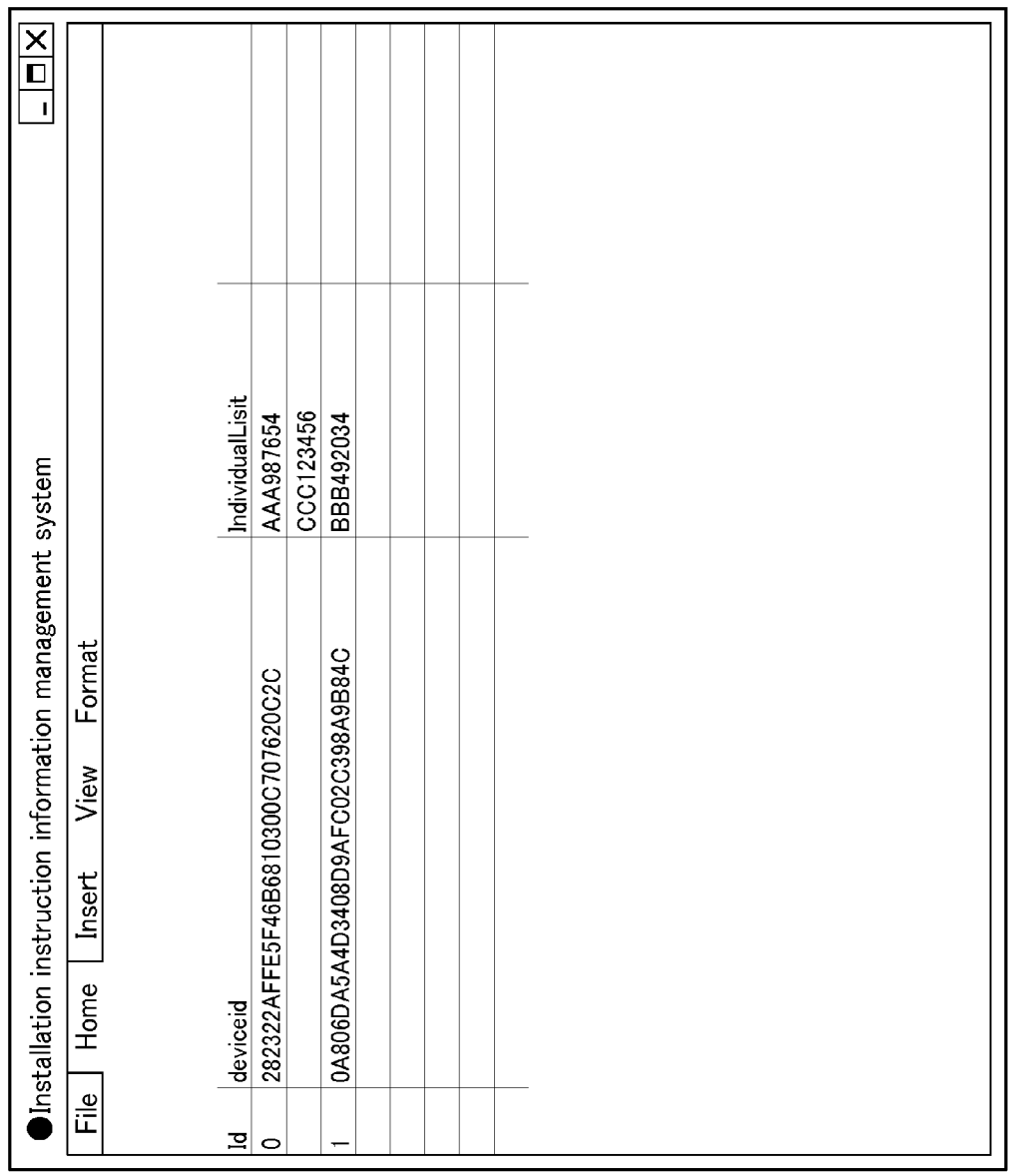
FIG. 15 is a main screen displayed by a management system.
Figure 16:
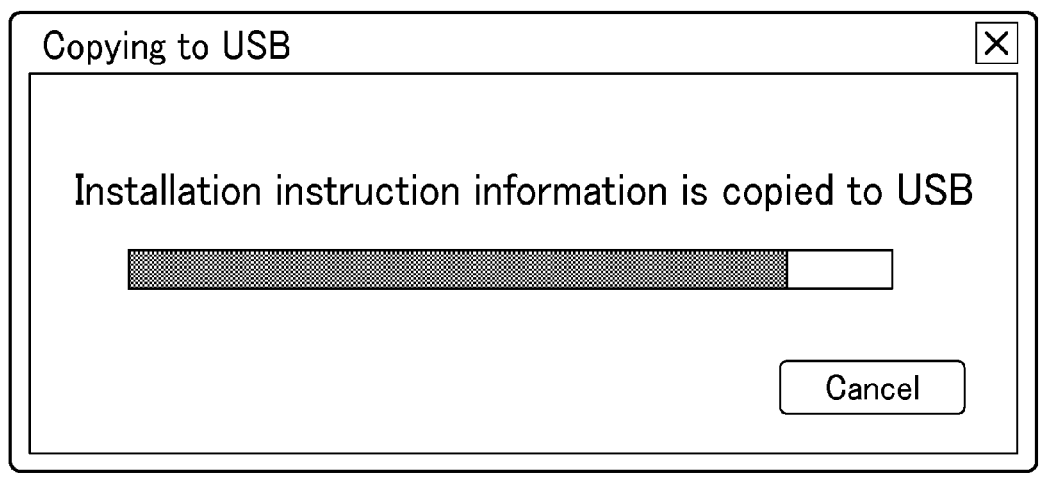
FIG. 16 is an implementing UI of installation instruction information output processing.

FIG. 13 is a flowchart illustrating an example of installation instruction information output processing. The management system 700 with which the client computer 103 is provided detects insertion of the USB storage 102, and subsequently executes the installation instruction information output processing. FIG. 15 is a main screen (UI) displayed by the management system 700. FIG. 16 is a UI for installation instruction information output processing that is in the process of execution.

When the management system 700 detects that the USB storage 102 has been inserted into the client computer 103, the management system 700 searches the saving instruction information 1000 that is saved in the USB storage 102 (step S1301).

Next, the management system 700 determines whether the saving instruction information 1000 is saved in the USB storage 102 (step S1302). In the case where the saving instruction information 1000 is not saved in the USB storage 102, the processing terminates. In the case where the saving instruction information 1000 is saved in the USB storage 102, the processing advances to step S1303.

In step S1303, the management system 700 retains a list of the saving instruction information that was found in step S1301 in the RAM 319. Subsequently, the management system 700 repetitively executes the processing from step S1304 to step S1309 several times in which the saving instruction information list retains. That is, the management system 700 acquires the saving instruction information of number n from the saving instruction information list (step S1304). Next, the management system 700 searches for the installation instruction information from the installation instruction information DB 703 using the ID of the image forming apparatus described in the saving instruction information as the key (step S1305). The management system 700 may also search for the installation instruction information from an external storage device.

FIG. 14 is an example of an installation instruction information DB. Installation instruction information retained in the installation instruction information DB 703 includes an ID of the image forming apparatus, firmware, a file of the extended program 406, a setting file, a function license that conducts validation, and the like.

Returning to FIG. 13, the management system 700 determines whether the installation instruction information was found (step S1306). In the case where the installation instruction information was not found, the processing advances to step S1307. In the case where the installation instruction information was found, the processing advances to step S1308.

In step S1307, the management system 700 adds the ID of the image forming apparatus that was used as a search key in the aforementioned step S1305 to an installation instruction information deficiency list. The processing then returns to step S1304 using n as the increment. The installation instruction information deficiency list is a list of information indicating that installation instruction information for an image forming apparatus requiring initial installation work was deficient. Otherwise, in step S1307, the management system 700 may also display a warning.

In step S1308, the management system 700 adds the ID of the image forming apparatus containing the saving instruction information of number n—i.e., the ID used as the search key in step S1305—to a copy target list for the USB storage 102. The copy target list is a list of installation instruction information that is copied to the USB storage.

Next, in step S1309, the management system 700 determines whether processing has been performed to the end of the saving instruction information list (step S1309). In the case where there is saving instruction information that has not been processed, the processing advances to step S1304. In the case where processing has been performed until the end of the saving instruction information list, the processing advances to step S1310.

In step S1310, the management system 700 copies the installation instruction information linked to the image forming apparatus ID in the saving instruction information contained in the copy target list to the USB storage 102. At this time, the management system 700 stores the history (saving history), that was obtained by copying the installation instruction information to the USB storage 102, in the installation instruction information DB 703. For example, the management system 700 establishes copy completion flags in the installation instruction information, and saves the date of copying, and the image forming apparatus IDs corresponding to the installation instruction information.

In the case where the saving history of the installation instruction information is in the installation instruction information DB 703, the management system 700 may skip step S1310. In other word, in the case where the management system 700 references the saving history, and determines that the installation instruction information corresponding to the ID contained in the saving instruction information is already saved in the USB storage 102 (installation work complete), it does not save the pertinent installation instruction information to the USB storage 102. By this means, it is possible to prevent installation instruction information for which installation work are complete from being written into the USB storage. Otherwise, in the case where it is determined that installation work are complete, the management system 700 may display a screen to urge that a check be conducted regarding whether to save the installation instruction information in the USB storage 102, and may decide whether or not to save the installation instruction information in accordance with operation of the screen.

Next, the management system 700 determines whether there is an image forming apparatus ID in the installation instruction information deficiency list prepared in step S1307 (step S1311). In the case where there is an image forming apparatus ID in the installation instruction information deficiency list, the processing advances to step S1312. In the case where there is no image forming apparatus ID in the installation instruction information deficiency list, the processing terminates.

In step S1312, the management system 700 notifies the user that installation instruction information corresponding to the saving instruction information does not exist (step S1312), and processing terminates.

An operational plan of an operator may be managed at the initial installation work site. With this operational plan, management is conducted with respect to when installation work are to be performed for which image forming apparatus, and how much time is required for the operations. For example, referencing the aforementioned operational plan, the management system 700 may notify the operator that an image forming apparatus is not yet ready for installation work. The management system 700 may also provide a notification that urges a user to newly prepare installation instruction information.

According to the first embodiment, after inserting the USB storage 102 into an image forming apparatus, an operator can store information required for initial installation in the USB storage 102 merely by insertion into an installation instruction information management system.

(Second Embodiment)

In order to enhance convenience for operators, an information management system of a second embodiment controls processing that copies installation instruction information to a USB storage based on the size of installation instruction information data. By this means, the operator can conduct initial installation work without confusion even in the case where a large amount of saving instruction information is written into the USB storage, and where a portion of the pertinent installation instruction information cannot be stored in the USB storage.

Figure 17:
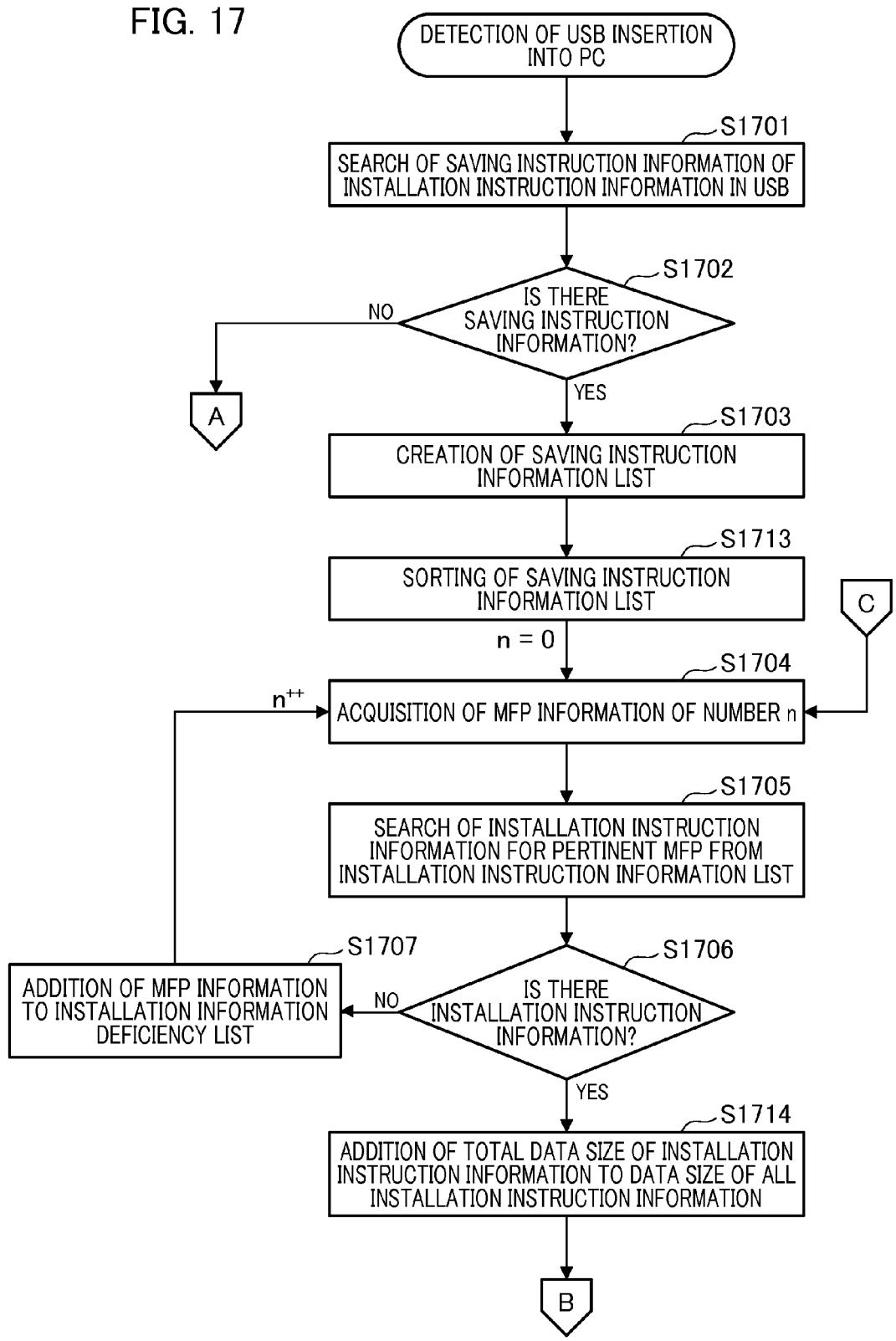
FIG. 17 is a flowchart illustrating installation instruction information output processing.
Figure 18:
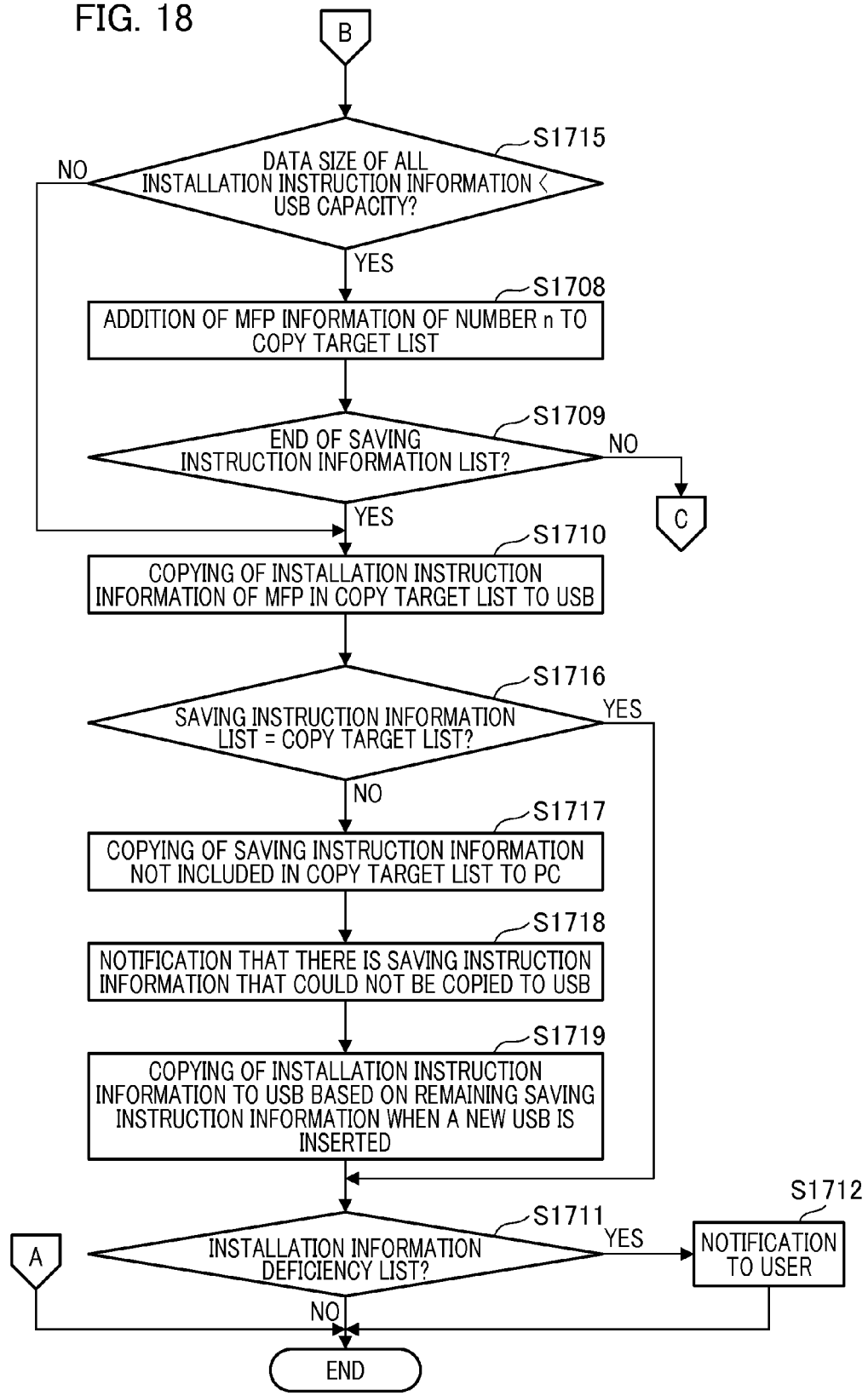
FIG. 18 is a flowchart illustrating installation instruction information output processing.

FIGS. 17 and 18 are flowcharts illustrating installation instruction information output processing in the second embodiment. Steps S1701 to S1703 of FIG. 17 are identical to steps S1301 to S1303 of FIG. 13.

In the second embodiment, the management system 700 sorts a saving instruction information list that was prepared in step S1703 (step S1713). For example, the management system 700 uses date information described for each piece of saving instruction information 1000 as a sorting key. By sorting into order using date information as the key, the management system 700 can preferentially write into the USB storage 102 installation instruction information corresponding to an image forming apparatus for which saving instruction information was stored in the USB storage 102 at an earliest date and time.

With respect to image forming apparatus that is subject to initial installation work, there are cases where the installation sites at customers targeted for introduction are predetermined. In such cases, the saving instruction information list may be sorted using an installation site as the key. By using installation sites as the keys, it is possible to determine priority by each installation site of introduction. Moreover, at the initial installation work site, there is a system that manages the operational plan of an operator. With this system, management is conducted with respect to when an installation operation is to be conducted for which image forming apparatus, how much time is required for the operation, and so on. Accordingly, the management system 700 may determine a priority sequence by using such system information as a sorting key.

Steps S1704 to S1707 are identical to steps S1304 to S1307 of FIG. 13. In the second embodiment, the management system 700 calculates the data size of the installation instruction information, and adds it to the total installation instruction information data size (step S1714), and the processing advances to step S1715 of FIG. 18. The data size of the installation instruction information includes all data sizes for automatically performing initial installation in an image forming apparatus, such as the data size of the script file configuring the installation instruction information, the data size of the firmware, the data size of the extended program, and on the like. The total installation instruction information data size is the total of all installation instruction information data sizes found by the search of step S1705.

The management system 700 determines whether the total installation instruction information data size is less or equal to the spare capacity of the USB storage 102 (step S1715). In the case where the total installation instruction information data size exceeds the spare capacity of the USB storage 102, the processing advances to step S1710, because copyable capacity is exceeded. In the case where the total installation instruction information data size is less or equal to the spare capacity of the USB storage 102, the processing advances to step S1708.

Steps S1708 to S1710 are identical to steps S1308 to S1310 of FIG. 13. In the second embodiment, the management system 700 determines whether all image forming apparatus corresponding to the saving instruction information list in step S1708 are included in the copy target list prepared in step S1708 (step S1716). In the case where all image forming apparatus information contained in the saving instruction information list is included in the copy target list, the processing advances to step S1711. In the case where there is image forming apparatus information that is not included in the copy target list, the processing advances to step S1717.

In step S1717, with respect to saving instruction information that is not included in the saving instruction information list, the management system 700 backs up (copies) the saving instruction information, which is not included in the copy target list for the corresponding image forming apparatus information, to the client computer 103.

Figure 19:
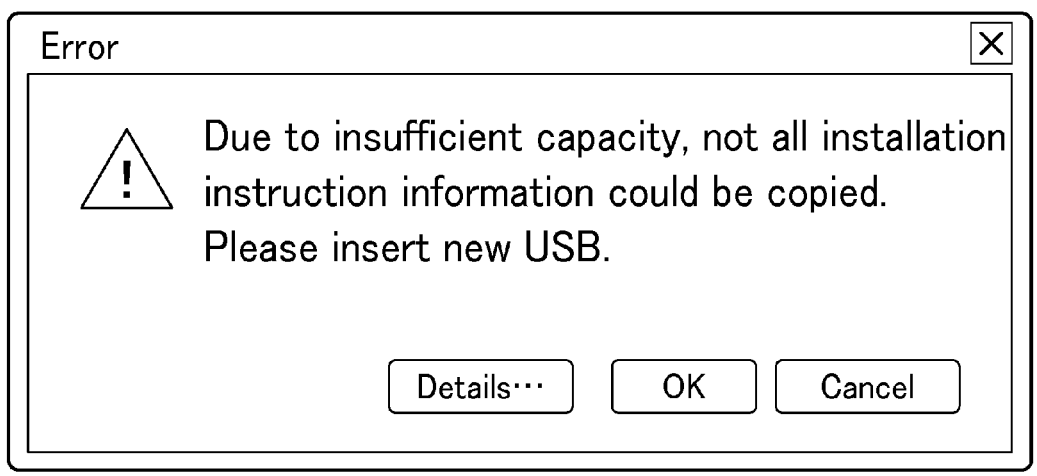
FIG. 19 is an exemplary warning screen.

Next, the management system 700 displays the warning screen shown in FIG. 19, and notifies the operator that there is installation instruction information that cannot be written into the USB storage 102. When the management system 700 detects that a USB storage 102 with spare capacity is connected, the installation instruction information corresponding to the saving instruction information that was backed up in step S1717 is saved to the USB storage 102 (step S1719). The processing then advances to step S1711.
(Other Embodiments)

Embodiments of the present invention can also be realized by a computer of a system or device that reads out and executes computer executable instructions recorded on a storage medium (e.g., non-transitory computer-readable storage medium) to perform the functions of one or more of the above-described embodiment(s) of the present invention, and by a method performed by the computer of the system or device by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-195925, filed on Sep. 20, 2013, which is hereby incorporated by reference herein in its entirety.

What is claimed is:

1. An information processing system, comprising:
    a device; and
    an information processing apparatus which enables connection of an external storage device,
        wherein the device comprises:
            a storing unit configured to store a saving instruction for data and for a script containing identification information of the device in the external storage device, in response to the device detecting that the data and the script required for software installation corresponding to the device do not exist in the external storage device when the external storage device is connected; and
            an installing unit configured to execute the software installation using the script and the data contained in the external storage device when the external storage device containing the script and the data corresponding to the device is connected, and
        wherein the information processing apparatus comprises:
            a determining unit configured to determine whether or not the saving instruction for the script and the data required for the software installation exists in the external storage device when the external storage device is connected; and
            a saving unit configured to acquire a script and data corresponding to the identification information of the device contained in the saving instruction for the script and the data required for software installation, and to save the script and the data to the external storage device, in response to a determination that the saving instruction exists in the external storage device,
            wherein the saving unit with which the information processing apparatus is provided further saves a saving history of the script and the data in the external storage device, and does not save the script and the data in the external storage device in response to a determination that upon referencing the saving history that the script and the data corresponding to the identification information contained in the saving instruction have been saved in the external storage device.

2. The information processing system according to claim 1, wherein, in response to a determination that the script and the data corresponding to the identification information contained in the saving instruction are already saved in the external storage device, the saving unit further displays a screen urging a determination regarding whether or not the script and the data have been saved in the external storage device, and determines whether or not to save the script and the data in the external storage device according to an operation on the screen.

3. The information processing system according to claim 1, wherein the saving unit with which the information processing apparatus is provided further saves the script and the data to the external storage device in order from the script and the data corresponding to the identification information contained in the saving instruction of high priority, when the size of the scripts and the data corresponding to the identification information contained in the saving instruction exceeds a capacity of the external storage device connected to the information processing apparatus, and
    wherein the saving unit saves the scripts and the data that is not saved to the external storage device to another external storage device when the another external storage device is newly connected.

4. The information processing system according to claim 3, wherein the saving unit determines a priority of the saving instruction based on any of information relating to a date on which the saving instruction is stored in the external storage device, information relating to an installation site of the device, and information relating to a time required for software installation in the device.

5. The information processing system according to claim 1, wherein the saving unit with which the information processing apparatus is provided acquires the script and the data corresponding to the identification information of the device contained in the saving instruction from an external device, and displays a warning in response to the device detecting that the script and the data do not exist in the external device.

6. An information processing apparatus enabling connection of an external storage device, comprising:
   a determining unit configured to determine whether or not a saving instruction for a script and data required for software installation exists in the external storage device when the external storage device is connected; and
   a saving unit configured to acquire a script and data corresponding to identification information of a device contained in the saving instruction, and to save the script and the data to the external storage device, in response to a determination that the saving instruction for the script and the data required for the software installation exists in the external storage device,
   wherein the saving instruction is stored in the external storage device together with the identification information of the device by the device that detects that the script and the data corresponding to the device do not exist in the external storage device when the external storage device is connected,
   wherein the saving unit further saves a saving history of the script and the data in the external storage device, and does not save the script and the data in the external storage device in response to a determination upon referencing the saving history that the script and the data corresponding to the identification information contained in the saving instruction have been saved in the external storage device.

7. The information processing apparatus according to claim 6, wherein the saving unit further saves the script and the data to the external storage device in order from the script and the data corresponding to devices of high priority, when the size of the scripts and the data corresponding to the identification information contained in the saving instruction exceeds a capacity of the external storage device connected to the information processing apparatus, and
   wherein the saving unit saves the scripts and the data that is not saved to the external storage device to another external storage device when the another external storage device is newly connected.

* * * * *